United States Patent
Wandera et al.

(10) Patent No.: US 11,746,206 B2
(45) Date of Patent: Sep. 5, 2023

(54) SOLIDIFIED, CONFORMABLE POROUS COMPOSITES AND RELATED DEVICES, METHODS, AND USES

(71) Applicant: AMTEK RESEARCH INTERNATIONAL LLC, Lebanon, OR (US)

(72) Inventors: Daniel Wandera, Corvallis, OR (US); Jeff M. Frenzel, Albany, OR (US); Richard W. Pekala, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 174 days.

(21) Appl. No.: 16/323,135

(22) PCT Filed: Aug. 4, 2017

(86) PCT No.: PCT/US2017/045612
§ 371 (c)(1),
(2) Date: Feb. 4, 2019

(87) PCT Pub. No.: WO2018/027187
PCT Pub. Date: Feb. 8, 2018

(65) Prior Publication Data
US 2019/0169395 A1    Jun. 6, 2019

Related U.S. Application Data

(60) Provisional application No. 62/371,453, filed on Aug. 5, 2016.

(51) Int. Cl.
| | |
|---|---|
| C08J 9/00 | (2006.01) |
| C08J 9/22 | (2006.01) |
| H01M 10/0525 | (2010.01) |
| H01M 10/06 | (2006.01) |
| H01M 50/411 | (2021.01) |
| H01M 50/417 | (2021.01) |
| H01M 50/431 | (2021.01) |
| H01M 50/437 | (2021.01) |
| H01M 50/44 | (2021.01) |
| H01M 50/446 | (2021.01) |
| H01M 50/491 | (2021.01) |
| C08J 9/32 | (2006.01) |

(52) U.S. Cl.
CPC .............. *C08J 9/22* (2013.01); *C08J 9/0066* (2013.01); *C08J 9/0085* (2013.01); *C08J 9/32* (2013.01); *H01M 50/411* (2021.01); *H01M 50/417* (2021.01); *H01M 50/431* (2021.01); *H01M 50/437* (2021.01); *H01M 50/44* (2021.01); *H01M 50/446* (2021.01); *H01M 50/491* (2021.01); *C08J 2300/20* (2013.01); *H01M 10/0525* (2013.01); *H01M 10/06* (2013.01)

(58) Field of Classification Search
CPC . C08J 9/0066; C08J 9/0085; C08J 9/22; C08J 9/32
See application file for complete search history.

(56) References Cited

U.S. PATENT DOCUMENTS

| | | | | |
|---|---|---|---|---|
| 3,086,247 | A * | 4/1963 | Rubens | C08L 25/02 264/418 |
| 3,457,217 | A * | 7/1969 | Oxel | C08L 25/06 521/55 |
| 5,605,569 | A * | 2/1997 | Boyer | H01M 10/10 106/482 |
| 6,635,202 | B1* | 10/2003 | Bugg | B29C 67/04 264/45.1 |
| 11,374,227 | B2 | 6/2022 | Wandera et al. | |
| 2002/0001753 | A1 | 1/2002 | Pekala et al. | |
| 2002/0037448 | A1 | 3/2002 | Fitts et al. | |
| 2006/0172198 | A1* | 8/2006 | Kakizaki | H01M 2/1653 429/247 |
| 2008/0113259 | A1* | 5/2008 | Brilmyer | H01M 2/1666 429/50 |
| 2009/0078918 | A1 | 3/2009 | Huettner et al. | |
| 2010/0035127 | A1* | 2/2010 | Brilmyer | H01M 2/1613 429/50 |
| 2012/0070714 | A1* | 3/2012 | Chambers | H01M 2/166 429/145 |

(Continued)

FOREIGN PATENT DOCUMENTS

| | | | | |
|---|---|---|---|---|
| CN | 102177601 | A | 9/2011 | |
| GB | 2212509 | A * | 7/1989 | ............... C08K 9/06 |

(Continued)

OTHER PUBLICATIONS

PCT/US2017/045612, International Preliminary Report and Patentability, dated Feb. 14, 2019, 7 pages.

(Continued)

*Primary Examiner* — Melissa A Rioja
(74) *Attorney, Agent, or Firm* — Dorsey & Whitney LLP

(57) ABSTRACT

A solidified, conformable porous composite having interconnected pores and containing thermally-expanded polymer microspheres and a particulate filler material is disclosed herein. An energy storage device containing a solidified, conformable porous composite having interconnected pores and comprising thermally-expanded polymer microspheres and particulate filler material is disclosed herein. A method of making a solidified, conformable porous composite in which no solvent is introduced into and extracted from the composite in the formation of pores is disclosed herein.

14 Claims, 6 Drawing Sheets

(56) References Cited

U.S. PATENT DOCUMENTS

| | | |
|---|---|---|
| 2012/0145468 A1 | 6/2012 | Pekala et al. |
| 2014/0033401 A1* | 2/2014 | Del Guasta .............. C08J 9/236 |
| | | 2/411 |
| 2015/0207121 A1 | 7/2015 | Frenzel et al. |
| 2015/0361241 A1 | 12/2015 | Loomis et al. |
| 2016/0104882 A1 | 4/2016 | Yushin et al. |
| 2016/0310924 A1 | 10/2016 | Nakatomi et al. |

FOREIGN PATENT DOCUMENTS

| | | | | |
|---|---|---|---|---|
| JP | 2001143680 A | * | 5/2001 | |
| KR | 20140070139 A | | 6/2014 | |
| WO | WO-2007143646 A2 | * | 12/2007 | .............. C08L 63/00 |
| WO | WO-2010147888 A2 | * | 12/2010 | ............ C09J 133/08 |
| WO | 2018027187 A1 | | 2/2018 | |
| WO | 2019152831 A1 | | 8/2019 | |

OTHER PUBLICATIONS

PCT/US2019/016333, International Search Report and Written Opinion, dated Mar. 26, 2019, 10 pages.
PCT/US2017/045612, International Search Report and Written Opinion, dated Oct. 13, 2017, 13 pages.
International Search Report and Written Opinion dated Oct. 13, 2017 for U.S. Application No. PCT/US2017/045612.
Chemical Power Sources, Government Institute Current Chemical Sources, Soviet Government 1961, p. 217.
Non-Final Office Action dated Mar. 28, 2023 received in U.S. Appl. No. 17/664,633.

\* cited by examiner

Fractured: Horizontal View

Fractured: Vertical View

Cross Section

SOLIDIFIED, CONFORMABLE POROUS COMPOSITES AND RELATED DEVICES, METHODS, AND USES

RELATED APPLICATIONS

This application is a United States National Phase entry of International Application No. PCT/US2017/045612, filed Aug. 4, 2017, which claims the benefit of U.S. Provisional Patent Application No. 62/371,453, filed Aug. 5, 2016. The entire contents of each of the foregoing applications are hereby incorporated by reference herein.

COPYRIGHT NOTICE

© 2017 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to solidified, conformable porous composites having interconnected pores and including thermally-expanded polymer microspheres and a particulate filler material. The solidified, conformable porous composites (1) exhibit good porosity without use of a process oil and attendant extraction solvent and (2) exhibit sufficient electrolyte wettability. Such solidified, conformable porous composites can be used as separators to improve the manufacturability and performance of energy storage devices such as lead-acid batteries.

BACKGROUND INFORMATION

Separators for lead-acid storage batteries have been formed of different materials as the technology has developed. Sheets of wood, paper, rubber, PVC, fiberglass, and silica-filled polyethylene have all found use over time. Currently, the lead-acid storage battery is commonly found in two modes of design, the valve-regulated recombinant (valve-regulated lead-acid (VRLA)) cell and the flooded cell. Both modes include positive and negative electrodes that are separated from each other by a porous battery separator. The porous separator prevents the electrodes from coming into physical contact and provides space for an electrolyte to reside. Such separators are formed of materials that are resistant to the sulfuric acid electrolyte, readily wettable in sulfuric acid, and sufficiently porous to permit the electrolyte to reside in the pores of the separator material, thereby permitting ionic current flow between adjacent positive and negative plates with low resistance.

More recently, enhanced flooded batteries (EFB) have been developed to meet the high cycling requirements in "start-stop" or "micro-hybrid" vehicle applications. In such applications, the engine is shut off while the vehicle is stopped (e.g., at a traffic light) and then re-started afterwards. The advantage of a "start-stop" vehicle design is that it results in reduced $CO_2$ emissions and better overall fuel efficiency. A major challenge in "start-stop" vehicles is that the battery must continue to supply all electrical functions during the stopped phase while being able to supply sufficient current to re-start the engine at the required moment. In such cases, the battery must exhibit higher performance with respect to cycling and recharge capability as compared to a traditional flooded lead-acid battery design.

In the case of "start-stop" applications, valve-regulated lead-acid (VRLA) batteries have demonstrated good cyclability in the field, but they suffer from relatively high cost and other concerns. As such, there continues to be a need for a mechanically robust, acid resistant, high porosity, separator that can be used throughout the life cycle of lead-acid storage batteries used in "start-stop" applications.

For silica-filled polyethylene separators, the traditional manufacturing process includes extrusion, extraction followed by drying, slitting, and winding steps. Precipitated silica is typically combined with a polyolefin, process oil, and various minor ingredients to form a separator mixture that is extruded at elevated temperature through a sheet die to form an oil-filled sheet. The oil-filled sheet is calendered to its desired thickness and profile, and the majority of the process oil is extracted. The sheet is dried to form a microporous polyolefin separator and is slit into an appropriate width for a specific battery design. During this manufacturing process, the extraction of the process oil and the drying of the extracting solvent are the limiting steps. The output of a production line depends on how fast the process oil can be removed and how quickly the solvent can be dried, both of which depend on the thickness of the separator products. Trichloroethylene (TCE) and hexane are commonly used as extracting solvents for the process oil, and they present challenges with respect to health, safety, and efficient recovery.

As such, there also continues to be a need for a battery separator that is manufactured without the use of hazardous and/or flammable solvents. The separator should exhibit desired properties such as good wettability, good porosity, and allow a battery to have high cyclability and recharge capability.

SUMMARY OF THE DISCLOSURE

It has been discovered that closed cell expandable microspheres can be combined with particulate filler material to form solidified, conformable porous composite having interconnected pores and containing thermally-expanded polymer microspheres and the particulate filler material. The solidified, conformable porous composites can be formed as battery separators with good wettability, good porosity, and that allow a battery to have high cyclability and recharge capability.

The expandable microspheres are preferably expandable polymer microspheres, such Expancel® (AkzoNobel N.V.), Advancell EM (Sekisui Chemical Co., Ltd.), Kureha Microsphere (Kureha Corp.), Dualite® (Chase Corp.), Clocell® (PolyChem Alloy). Expancel microspheres are small spherical thermoplastic particles that consist of a polymer shell encapsulating a gas. When heated, the internal pressure from the gas increases, meanwhile the thermoplastic shell softens. Accordingly, with the gas trapped inside the spheres, the volume of the microspheres increases.

The particulate filler material preferably includes an inorganic material. The inorganic material preferably includes an inorganic oxide, carbonate, or hydroxide, such as, for example, alumina, silica, zirconia, titania, mica, boehmite, or mixtures thereof. The inorganic material provides electrolyte-wettability for the solidified, conformable porous composite. The inorganic material can be porous or nonporous. The inorganic material can be in a variety of forms, such as particles in milled or unmilled form, fibers (such as microglass fibers), platelets, or nanotubes. The inorganic material is preferably insoluble in sulfuric acid, a common electrolyte used in lead-acid batteries. The inorganic material can be insoluble in potassium hydroxide, a common electrolyte used in alkaline batteries. The inorganic material is preferably about 30 wt % to about 90 wt % of the solidified, conformable porous composite.

Compression and heat are preferably used to form the solidified, conformable porous composites. Particulate filler material is preferably mixed with expandable microspheres and then heated in a confined volumetric space, such as a mold. The process can be on a batch or continuous basis. Likewise, the solidified, conformable porous composites can be formed in situ between electrodes of a battery.

The porosity of the solidified, conformable porous composite is preferably 30% or more, such as about 40% or more, about 50% or more, about 60% or more, about 70% or more, or about 80% or more, as determined by water porosity. For example, the porosity can be about 30% to about 90%, about 40% to about 90%, about 50% to about 90%, about 60% to about 90%, about 70% to about 90%, about 75% to about 90%, about 80% to about 90%, or about 85% to about 90%.

Mechanical reinforcement material can be added to increase the structural strength of the solidified, conformable porous composites. The mechanical reinforcement material can be a support formed primarily on one or both major surfaces of the solidified, conformable porous composite or embedded at least partially in the bulk structure of the solidified, conformable porous composite. Examples of the support include a foam, a sheet, a film, a web, a membrane, a woven or non-woven mat, a mesh, or a combination thereof.

The solidified, conformable porous composite is preferably electrolyte-wettable and has a porosity range of about 30-90%, as determined by water porosity measurement (for example BCIS-03-6 test method for porosity (volume) and moisture content). The solidified, conformable porous composites as described can be used to separate the electrodes in an energy storage device, for example, a battery, electrochemical double layer capacitor, supercapacitor, or fuel cell, where the pores can be filled with electrolyte. Such separators are beneficial to the manufacture of energy storage devices.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
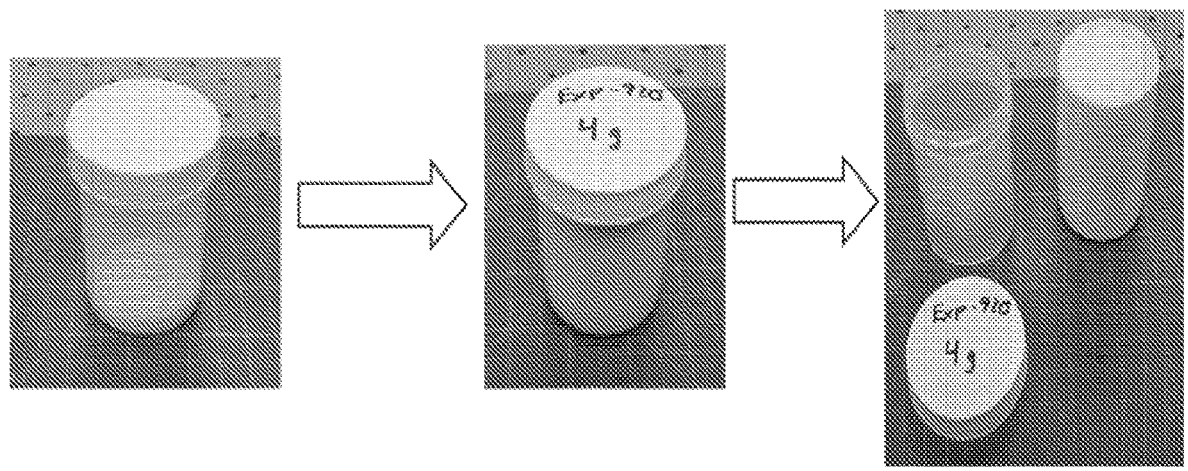
FIG. 1 depicts pictures showing process steps from Example 3.
Figure 2A:
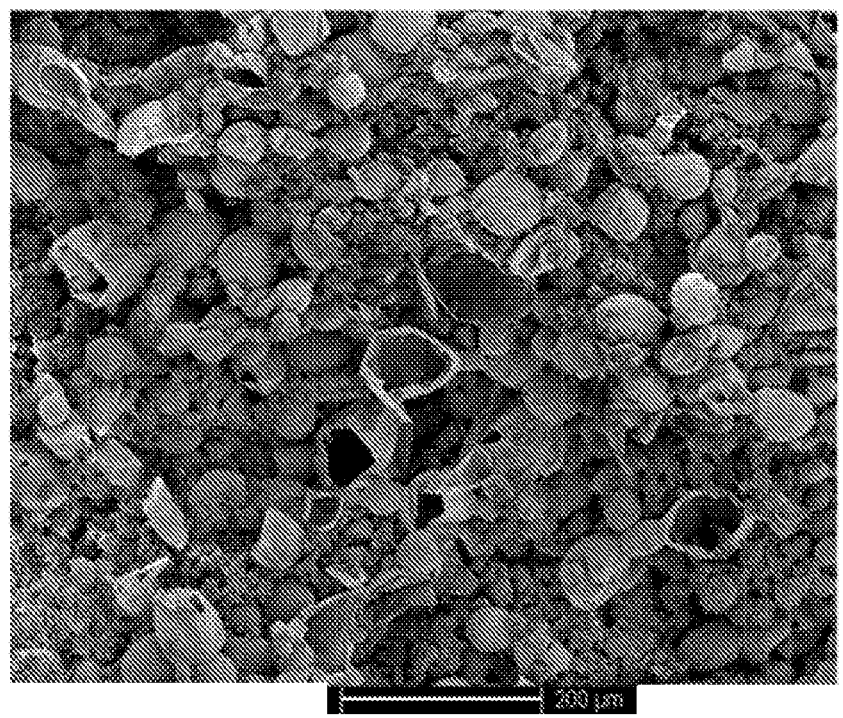
FIG. 2A depicts SEM fractured horizontal view images for samples obtained from Example 9.
Figure 2A:
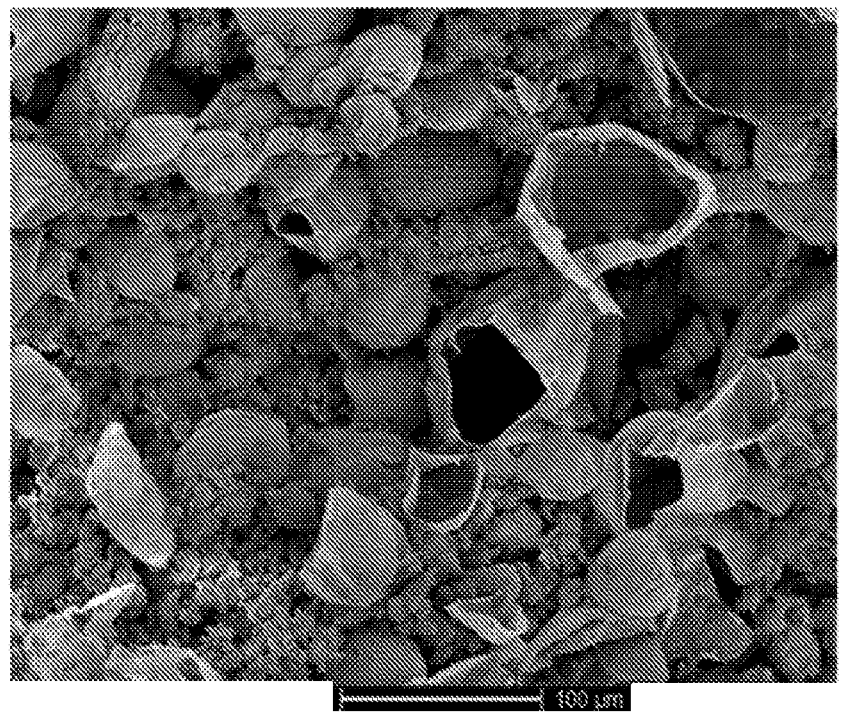
Figure 2B:
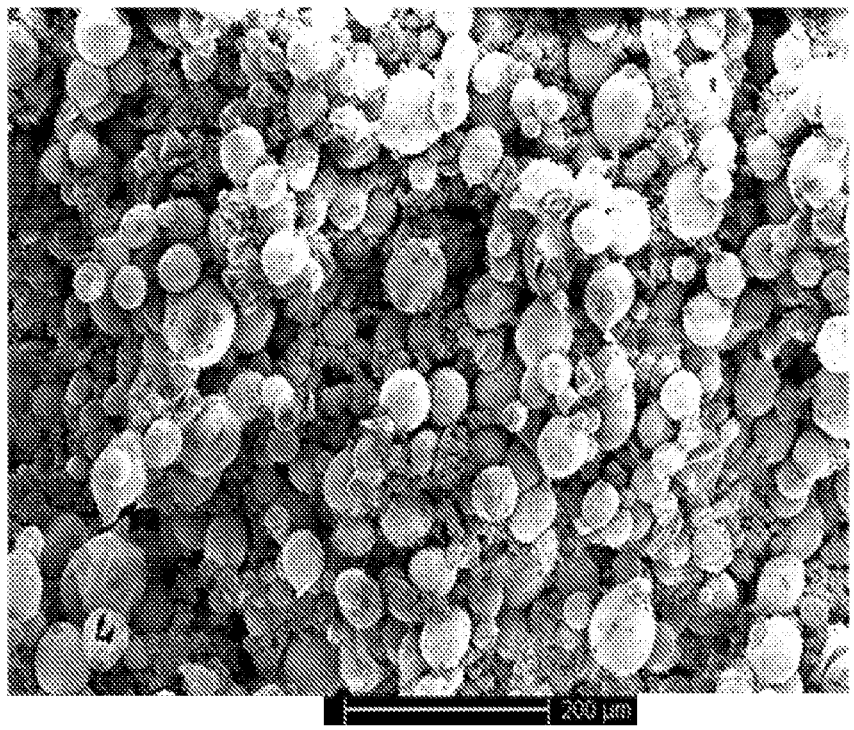
FIG. 2B depicts SEM fractured vertical view images for the same samples as in FIG. 2A.
Figure 2B:
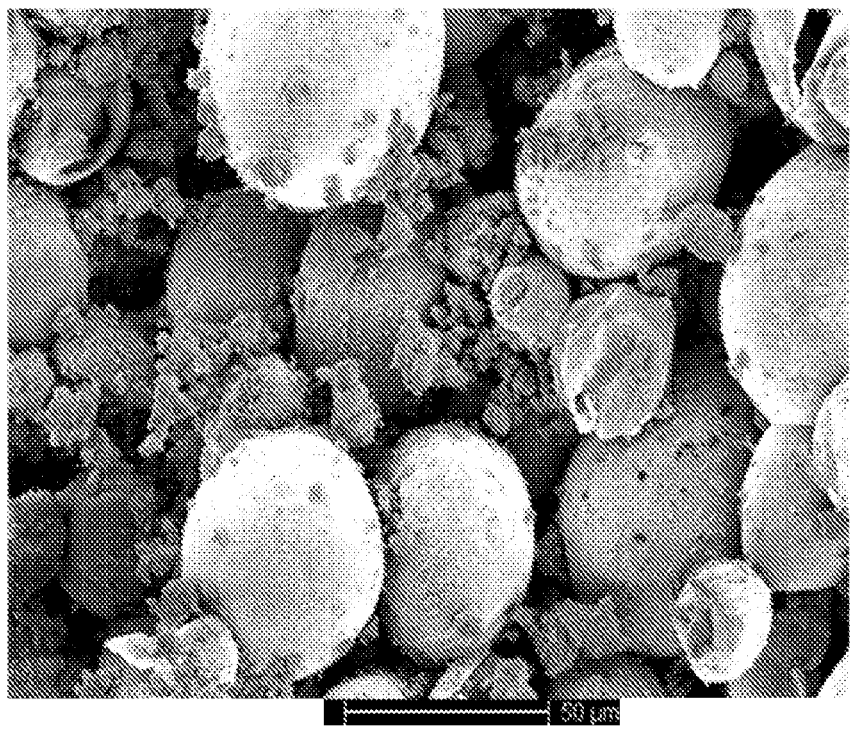
Figure 3:
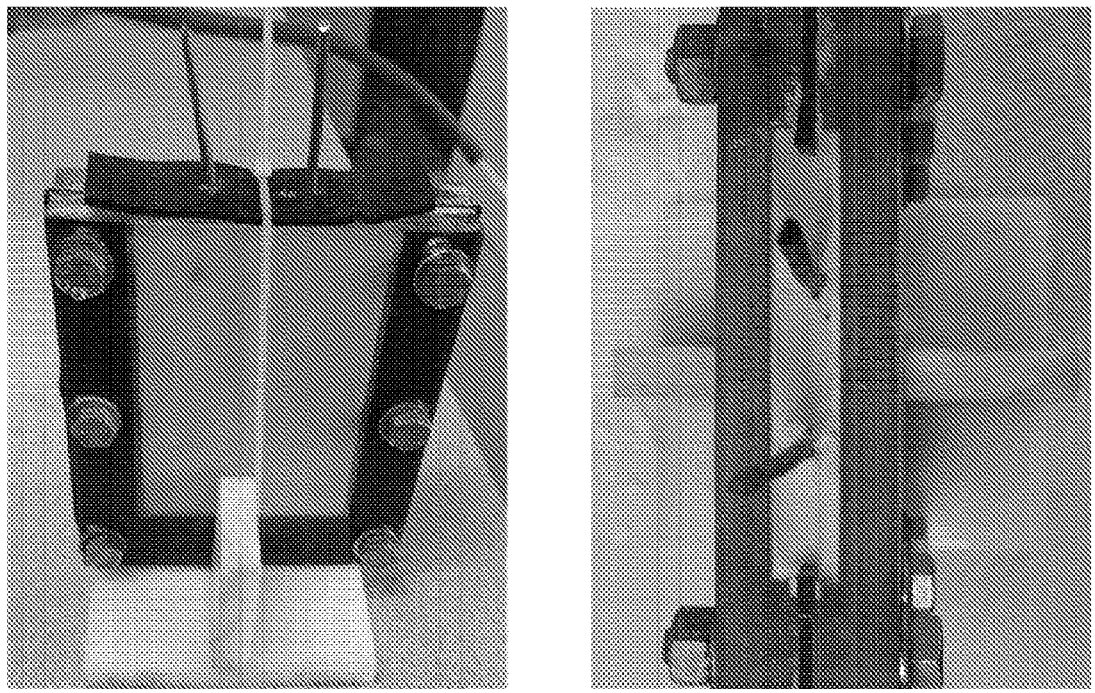
FIG. 3 depicts pictures showing the single cell from Example 10.
Figure 4:
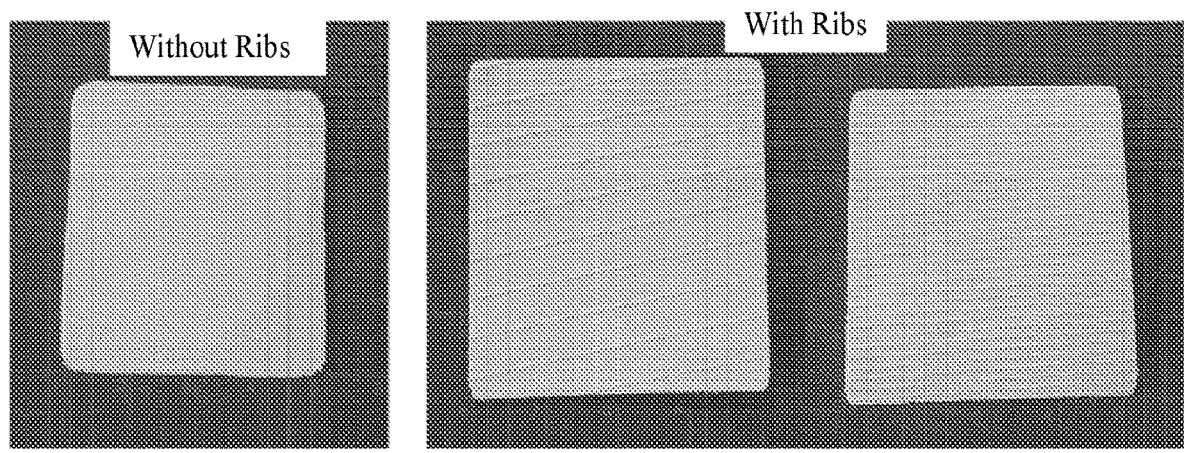
FIG. 4 depicts samples prepared from Example 11.
Figure 5A:
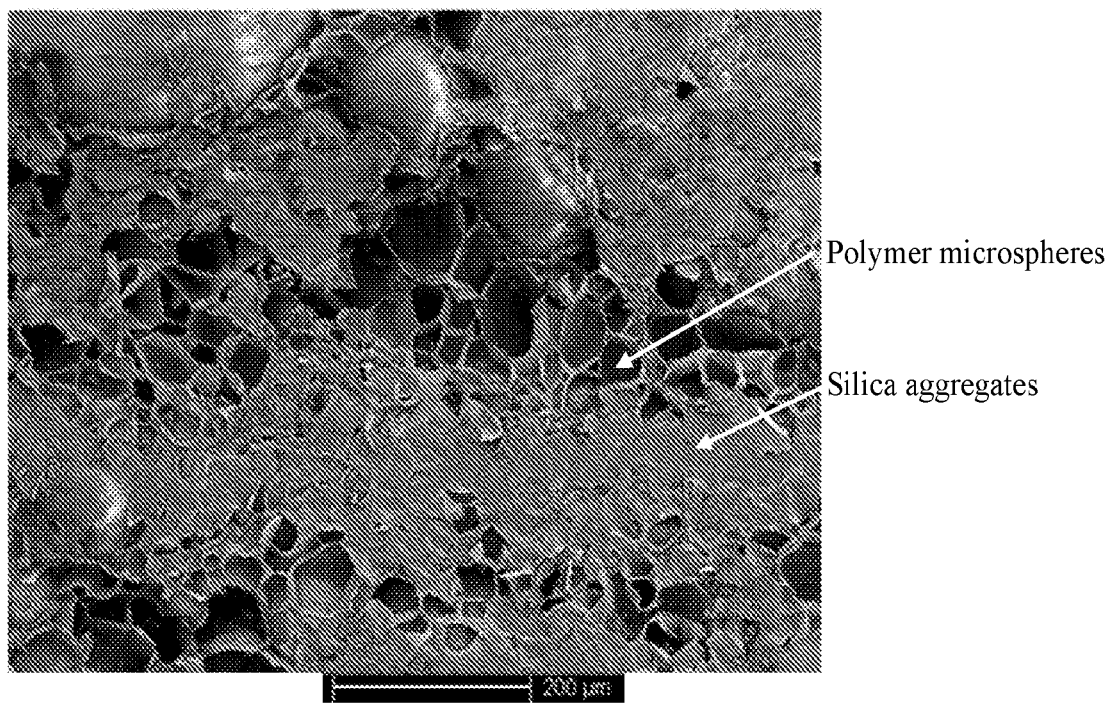
FIG. 5A depicts SEM images of the top surface of samples obtained from Example 12.
Figure 5A:
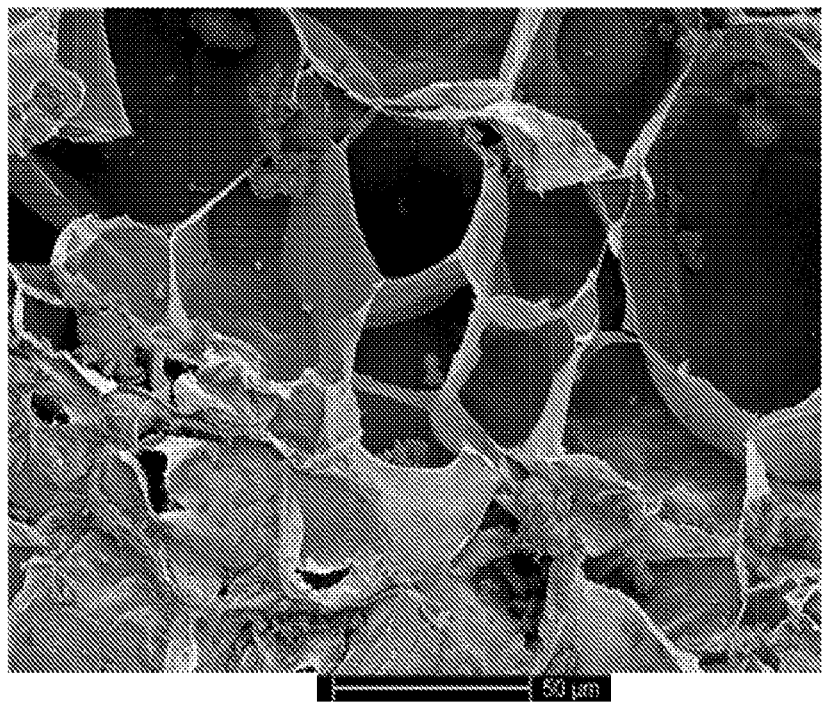
Figure 5B:
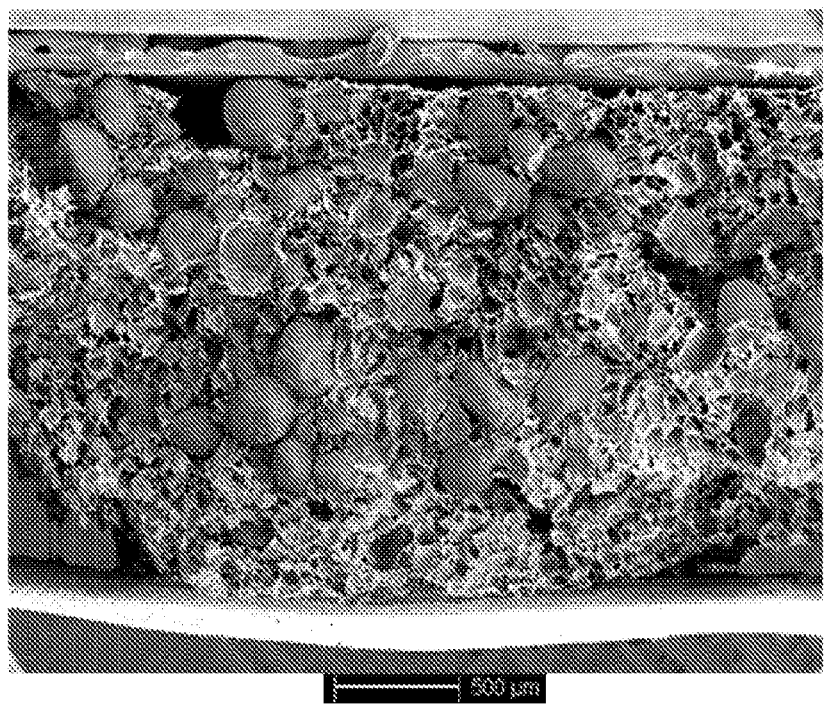
FIG. 5B depicts SEM images for cross-sections for the same samples as in FIG. 5A.
Figure 5B:
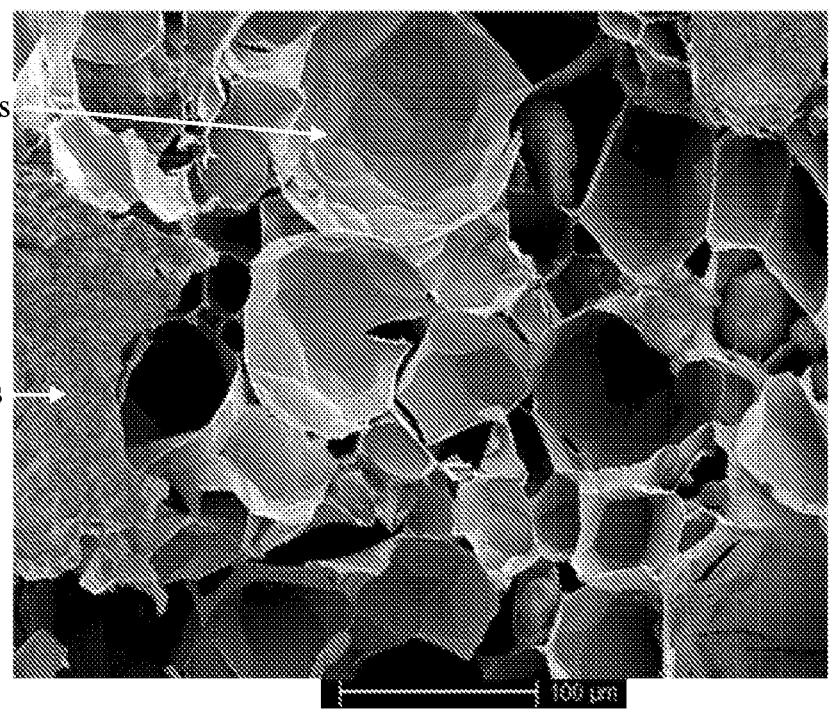

A solidified, conformable porous composites having interconnected pores and containing thermally-expanded microspheres and particulate filler material can be made by mixing expandable microspheres with particulate filler material. The microspheres can be in a dry powder or an aqueous dispersion. Likewise, the particulate filler material can be in a dry powder or an aqueous dispersion. The mixture can then be placed in a mold (or other volumetric confined space) and heated for a sufficient duration to bond the materials together. Expansion of the microspheres provides the necessary compression for bonding. The volume of the mold (which dictates pressure as the microspheres expand) and the temperature and duration of heating can be used to rupture at least a portion of the thermally-expanded polymer microspheres by the escape of the encapsulated gas in the microspheres. After expansion, the mold is slowly cooled. The microspheres stay in an expanded state, bonded together. The solidified, conformable porous composite is then removed from the mold. When an aqueous dispersion is present, then the water can be evaporated off as part of the formation process. A mechanical reinforcement material can be placed in the mold prior to heating the mixture. As used herein, "solidified, conformable porous composite" means that the composite is a solid that has conformed to the shape of the volumetric confined space that the expandable microspheres and the particulate filler material were heated in.

The mold (or other volumetric confined space) can be patterned to provide various rib patterns. Additionally, the solidified, conformable porous composites can be further shaped after removal from the mold. The solidified, conformable porous composites can be formed as a sheet or other desired geometry. For example, a sheet can be formed that has at least one patterned major surface and has regions with a thickness of about 0.3 mm to about 0.6 mm or about 0.4 mm to about 0.5 mm and has regions with an thickness of about 0.5 mm to about 5 mm or about 1 mm to about 3 mm.

The same process can be repeated in a cell of a battery or other energy storage device. A free-flowing mixture of expandable microspheres and particulate filler material can be placed between the electrodes of the cell, the cell capped, and then heat applied to the cell. The fixed volume of the cell provides the necessary compression as the microspheres expand. It is not necessary to remove the solidified, conformable porous composites from the cell. Electrolyte can be added directly to the cell after formation of the solidified, conformable porous composite.

The solidified, conformable porous composites (either formed in situ or in a mold) have good contact with electrodes and no leaching from expanded Expancel microspheres in acid has been detected. The solidified, conformable porous composites have good acid-wettability, good porosity, and allow a battery to have high cyclability and recharge capability.

The solidified, conformable porous composites can be used with a number of energy storage devices, such as an alkaline battery or a lead-acid battery. The solidified, conformable porous composite can constitute a separator or a portion thereof.

The particulate filler material of the solidified, conformable porous composites can include an additive. The solidified, conformable porous composites can include additives that beneficially impact energy storage device performance. Preferred additives include a hydrogen-evolution inhibitor, electrolyte-soluble pore former, a structure-enhancing agent, a wettability-enhancing agent, or combinations thereof. Certain additives can perform multiple functions.

Turning now to specific exemplary additives, the electrolyte-soluble pore former dissolves in the electrolyte (typically sulfuric acid for lead acid batteries and aqueous potassium hydroxide for alkaline batteries) after the battery is assembled and the electrolyte is added. Dissolution of the electrolyte-soluble pore former results in an increase in separator porosity, modification to interconnectivity between mutually adjacent pores (i.e., tortuosity) of the separator, and enhanced pore size distribution. The battery can optionally be flushed with fresh electrolyte after dissolution of the electrolyte-soluble pore former. For lead-acid batteries, preferably, the electrolyte-soluble pore former is magnesium hydroxide, magnesium oxide, or a combination thereof. The electrolyte-soluble pore former can include a sulfate of zinc, lithium, aluminum, magnesium, tin, potassium, or sodium. The electrolyte-soluble pore former can also include a carbonate of lithium, magnesium, potassium, or sodium. The electrolyte-soluble pore former can be combined with the inorganic material referenced above that provides electrolyte-wettability for the solidified, conformable porous composites.

The hydrogen-evolution inhibitor can be distributed throughout the pore structure of the solidified, conformable porous composites. Examples of hydrogen-evolution inhibitors include benzaldehyde derivatives, such as vanillin, ortho-anisaldehyde, 2-hydroxybenzaldehyde, 4-methoxybenzaldehyde, 2,4-dimethoxybenzaldehyde, 2,5-dimethoxybenzaldehyde, veratraldehyde (3,4-dimethoxybenzaldehyde), and 2,3,4 trimethoxybenzaldehyde.

The solidified, conformable porous composites can also include additives that are not particulate filler materials, such as a surface active molecule, such as sodium dodecylbenzene sulfonate or sodium dihexyl sulfosuccinate. Other additives for non-energy storage device uses include fragrances.

The ability to form the solidified, conformable porous composites in situ can have manufacturing benefits. For example, the solidified, conformable porous composites can be made during battery assembly. This could facilitate manufacture of a lead-acid battery in a bipolar stack configuration with its attendant benefits in energy density and uniform current density. Other manufacturing benefits of the solidified, conformable porous composites (either formed in situ or in a mold) will be apparent to those skilled in the art.

In addition to separators, the solidified, conformable porous composites could be used in the manufacture of other components of an energy storage device, such as a flame arrestor. Additionally, the solidified, conformable porous composites could be used for non-energy storage device related uses, such as fragrance storage.

EXAMPLES

For each Example, firm and stable solidified, conformable porous composites were formed by mixing dry powders as listed in Table 1.

For Examples 1-9, the well-mixed dry powder was oven heated at the listed temperature for 1 hour in a tightly sealed 4 oz. plastic jar (see FIG. 1) that provided the required compression to the expanding microspheres which led to the bonding of the mixed powder forming a firm and strong solidified, conformable porous composite.

For Example 10, the solidified, conformable porous composite was formed by bonding the listed formulation of mixed dry powders within a single cell consisting of one positive and one negative electrode harvested from a Deka YB16B dry charged motorcycle battery (East Penn Manufacturing Co., Inc.). The cell was capped and placed in an oven to cure at the listed temperature for two hours. The cell showed high cycling and recharge capability.

For Examples 11-48, the well-mixed dry powder formulation listed and a glass fiber mat were pressed between molds with a gasket and heated at the listed temperature under constant compression for 15 minutes. The mold was allowed to cool slowly before removing the sample. The mold plates were designed with grooves in them so that the finished sample had a ribbed surface. The overall thickness of Examples 11-48 ranged from about 0.5 mm to about 3 mm.

The electrical resistance of Example 26 was evaluated using a DC-pulse technique. Samples were soaked in sulfuric acid and then placed in a test bath. The example showed sufficiently low electrical resistance, indicating good electrolyte wettability.

TABLE 1

| Ex. # | Formulation | Mold or Shape | Processing Temp. (° C.) | Mechanical Reinforcement Type | Porosity (%) |
|---|---|---|---|---|---|
| 1 | 5 g of 3:1 Aerosil 200 Fumed Silica:Expancel 920 DU 120 Powder | Plastic Jar | 140 | N/A | 80 |
| 2 | 5 g of 4:1 Aerosil 200 Fumed Silica:Expancel 920 DU 120 Powder | Plastic Jar | 140 | N/A | 85 |
| 3 | 4 g of 3:1 Milled *Rhodia* 1165 Micropearl Silica:Expancel 920 DU 120 Powder | Plastic Jar | 140 | N/A | 80 |
| 4 | 6 g of 3:1 Milled *Rhodia* 1165 Micropearl Silica:Expancel 920 DU 120 Powder | Plastic Jar | 140 | N/A | 80 |
| 5 | 10 g of 4:1 Milled *Rhodia* 1165 Micropearl Silica:Expancel 920 DU 120 Powder | Plastic Jar | 140 | N/A | 85 |
| 6 | 14 g of 3:2 Milled *Rhodia* 1165 Micropearl Silica:Expancel 031 DU 40 Powder | Plastic Jar | 110 | N/A | 50 |
| 7 | 14 g of 3:1 Milled *Rhodia* 1165 Micropearl Silica:Expancel 031 DU 40 Powder | Plastic Jar | 100 | N/A | 60 |

TABLE 1-continued

| Ex. # | Formulation | Mold or Shape | Processing Temp. (° C.) | Mechanical Reinforcement Type | Porosity (%) |
|---|---|---|---|---|---|
| 8 | 12 g of 3:1 Milled *Rhodia* 1165 Micropearl Silica:Expancel 031 DU 40 Powder | Plastic Jar | 95 | N/A | 60 |
| 9 | 10 g of 3:1 Milled *Rhodia* 1165 Micropearl Silica:Expancel 031 DU 40 Powder | Plastic Jar | 95 | N/A | 60 |
| 10 | 9:1 Unmilled *Rhodia* 1165 Micropearl Silica:Expancel 031 DU 40 Powder | Single Cell | 95 | N/A | 75 |
| 11 | 6 g of 13:7 Unmilled *Rhodia* 1165 Micropearl Silica:Expancel 031 DU 40 Powder | Flat Sheet | 90 | Glass Fiber mat | 50 |
| 12 | 6 g of 3:1 Unmilled *Rhodia* 1165 Micropearl Silica:Expancel 031 DU 40 Powder | Flat Sheet | 90 | Glass Fiber mat | 60 |
| 13 | 6 g of 4:1 Unmilled *Rhodia* 1165 Micropearl Silica:Expancel 031 DU 40 Powder | Flat Sheet | 90 | Glass Fiber mat | 65 |
| 14 | 6 g of 17:3 Unmilled *Rhodia* 1165 Micropearl Silica:Expancel 031 DU 40 Powder | Flat Sheet | 90 | Glass Fiber mat | 70 |
| 15 | 6 g of 9:1 Unmilled *Rhodia* 1165 Micropearl Silica:Expancel 031 DU 40 Powder | Flat Sheet | 90 | Glass Fiber mat | 75 |
| 16 | 6 g of 2:1:1 Unmilled *Rhodia* 1165 Micropearl Silica:Hi-Sil ABS Silica:Expancel 031 DU 40 Powder | Flat Sheet | 90 | Glass Fiber mat | 60 |
| 17 | 6 g of 2:1:1 Unmilled *Rhodia* 1165 Micropearl Silica:Tixosil 43 Silica:Expancel 031 DU 40 Powder | Flat Sheet | 90 | Glass Fiber mat | 60 |
| 18 | 6 g of 5:3:2 Unmilled *Rhodia* 1165 Micropearl Silica:Hi-Sil ABS Silica:Expancel 031 DU 40 Powder | Flat Sheet | 90 | Glass Fiber mat | 65 |
| 19 | 6 g of 5:3:2 Unmilled *Rhodia* 1165 Micropearl Silica:Tixosil 43 Silica:Expancel 031 DU 40 Powder | Flat Sheet | 90 | Glass Fiber mat | 65 |
| 20 | 6 g of 2:2:1 Unmilled *Rhodia* 1165 Micropearl Silica:Hi-Sil ABS Silica:Expancel 031 DU 40 Powder | Flat Sheet | 90 | Glass Fiber mat | 65 |
| 21 | 6 g of 2:2:1 Unmilled *Rhodia* 1165 Micropearl Silica:Tixosil 43 Silica:Expancel 031 DU 40 Powder | Flat Sheet | 90 | Glass Fiber mat | 65 |
| 22 | 6 g of 16:1:3 Unmilled *Rhodia* 1165 Micropearl Silica:Titanium dioxide:Expancel 031 DU 40 Powder | Flat Sheet | 90 | Glass Fiber mat | 65 |
| 23 | 6 g of 16:1:3 Unmilled *Rhodia* 1165 Micropearl Silica:Carbon black:Expancel 031 DU 40 Powder | Flat Sheet | 90 | Glass Fiber mat | 65 |
| 24 | 5 g of 3:7 Unmilled *Rhodia* 1165 Micropearl Silica:Expancel 920 DU 120 Powder | Flat Sheet | 150 | Glass Fiber mat | 45 |
| 25 | 5 g of 1:1 Unmilled *Rhodia* 1165 Micropearl Silica:Expancel 920 DU 120 Powder | Flat Sheet | 150 | Glass Fiber mat | 60 |
| 26 | 5 g of 7:3 Unmilled *Rhodia* 1165 Micropearl Silica:Expancel 920 DU 120 Powder | Flat Sheet | 150 | Glass Fiber mat | 75 |
| 27 | 5 g of 9:1 Unmilled *Rhodia* 1165 Micropearl Silica:Expancel 920 DU 120 Powder | Flat Sheet | 150 | Glass Fiber mat | 90 |

TABLE 1-continued

| Ex. # | Formulation | Mold or Shape | Processing Temp. (° C.) | Mechanical Reinforcement Type | Porosity (%) |
|---|---|---|---|---|---|
| 28 | 5 g of 6:7:7 Unmilled *Rhodia* 1165 Micropearl Silica:Expancel 920 DU 120 Powder:High Molecular Weight Polyethylene | Flat Sheet | 150 | Glass Fiber mat | 45 |
| 29 | 5 g of 2:1:1 Unmilled *Rhodia* 1165 Micropearl Silica:Expancel 920 DU 120 Powder:High Molecular Weight Polyethylene | Flat Sheet | 150 | Glass Fiber mat | 60 |
| 30 | 5 g of 14:3:3 Unmilled *Rhodia* 1165 Micropearl Silica:Expancel 920 DU 120 Powder:High Molecular Weight Polyethylene | Flat Sheet | 150 | Glass Fiber mat | 75 |
| 31 | 5 g of 6:7:7 Unmilled *Rhodia* 1165 Micropearl Silica:Expancel 920 DU 120 Powder:Maleic Anhydride Modified Polypropylene | Flat Sheet | 150 | Glass Fiber mat | 45 |
| 32 | 5 g of 2:1:1 Unmilled *Rhodia* 1165 Micropearl Silica:Expancel 920 DU 120 Powder:Maleic Anhydride Modified Polypropylene | Flat Sheet | 150 | Glass Fiber mat | 60 |
| 33 | 5 g of 14:3:3 Unmilled *Rhodia* 1165 Micropearl Silica:Expancel 920 DU 120 Powder:Maleic Anhydride Modified Polypropylene | Flat Sheet | 150 | Glass Fiber mat | 75 |
| 34 | 5 g of 6:7:7 Unmilled *Rhodia* 1165 Micropearl Silica:Expancel 920 DU 120 Powder:MIPELON™ Fine Particle Ultra High Molecular Weight Polyethylene Powder | Flat Sheet | 150 | Glass Fiber mat | 45 |
| 35 | 5 g of 2:1:1 Unmilled *Rhodia* 1165 Micropearl Silica:Expancel 920 DU 120 Powder:MIPELON™ Fine Particle Ultra High Molecular Weight Polyethylene Powder | Flat Sheet | 150 | Glass Fiber mat | 60 |
| 36 | 5 g of 14:3:3 Unmilled *Rhodia* 1165 Micropearl Silica:Expancel 920 DU 120 Powder:MIPELON™ Fine Particle Ultra High Molecular Weight Polyethylene Powder | Flat Sheet | 150 | Glass Fiber mat | 75 |
| 37 | 5 g of 6:7:7 Unmilled *Rhodia* 1165 Micropearl Silica:Expancel 920 DU 120 Powder:Polyethylene Wax | Flat Sheet | 150 | Glass Fiber mat | 45 |
| 38 | 5 g of 2:1:1 Unmilled *Rhodia* 1165 Micropearl Silica:Expancel 920 DU 120 Powder:Polyethylene Wax | Flat Sheet | 150 | Glass Fiber mat | 60 |
| 39 | 5 g of 14:3:3 Unmilled *Rhodia* 1165 Micropearl Silica:Expancel 920 DU 120 Powder:Polyethylene Wax | Flat Sheet | 150 | Glass Fiber mat | 75 |
| 40 | 5 g of 6:7:7 Unmilled *Rhodia* 1165 Micropearl Silica:Expancel 920 DU 120 Powder:Secondary Alkyl Sulfonate Surfactant | Flat Sheet | 150 | Glass Fiber mat | 45 |
| 41 | 5 g of 2:1:1 Unmilled *Rhodia* 1165 Micropearl Silica:Expancel 920 DU 120 Powder:Secondary Alkyl Sulfonate Surfactant | Flat Sheet | 150 | Glass Fiber mat | 60 |
| 42 | 5 g of 14:3:3 Unmilled *Rhodia* 1165 Micropearl Silica:Expancel 920 DU 120 Powder:Secondary Alkyl Sulfonate Surfactant | Flat Sheet | 150 | Glass Fiber mat | 75 |

TABLE 1-continued

| Ex. # | Formulation | Mold or Shape | Processing Temp. (° C.) | Mechanical Reinforcement Type | Porosity (%) |
|---|---|---|---|---|---|
| 43 | 5 g of 6:7:7 Unmilled *Rhodia* 1165 Micropearl Silica:Expancel 920 DU 120 Powder:Vanillin | Flat Sheet | 150 | Glass Fiber mat | 45 |
| 44 | 5 g of 2:1:1 Unmilled *Rhodia* 1165 Micropearl Silica:Expancel 920 DU 120 Powder:Vanillin | Flat Sheet | 150 | Glass Fiber mat | 60 |
| 45 | 5 g of 14:3:3 Unmilled *Rhodia* 1165 Micropearl Silica:Expancel 920 DU 120 Powder:Vanillin | Flat Sheet | 150 | Glass Fiber mat | 75 |
| 46 | 5 g of 6:7:7 Unmilled *Rhodia* 1165 Micropearl Silica:Expancel 920 DU 120 Powder:Micronized Rubber Powder | Flat Sheet | 150 | Glass Fiber mat | 45 |
| 47 | 5 g of 2:1:1 Unmilled *Rhodia* 1165 Micropearl Silica:Expancel 920 DU 120 Powder:Micronized Rubber Powder | Flat Sheet | 150 | Glass Fiber mat | 60 |
| 48 | 5 g of 14:3:3 Unmilled *Rhodia* 1165 Micropearl Silica:Expancel 920 DU 120 Powder:Micronized Rubber Powder | Flat Sheet | 150 | Glass Fiber mat | 75 |

It will be apparent to those having skill in the art that many changes may be made to the details of the above-described embodiments without departing from the underlying principles of the invention.

The invention claimed is:

1. A solidified porous composite comprising:
a thermally-expanded polymer matrix comprising compression and heat-bonded polymer microspheres having been thermally-expanded to fill a fixed volume cavity of a mold, wherein at least a portion of the compression and heat-bonded polymer microspheres are ruptured, the thermally-expanded polymer matrix having solidified and conformed to a shape of the fixed volume cavity; and
a particulate filler material distributed throughout the polymer matrix,
wherein the solidified porous composite comprises interconnected pores extending through the polymer matrix and a porosity of 30% or more; and
wherein the porous composite is free of a mechanical reinforcement material.

2. The solidified porous composite of claim 1, in which the solidified porous composite is electrolyte-wettable and has a porosity range of 30-90%, as determined by water porosity.

3. The solidified porous composite of claim 1, in which the compression and heat-bonded polymer microspheres and the particulate filler material comprise bonded dry powders or a bonded aqueous dispersion.

4. The solidified porous composite of claim 1, in which the particulate filler material comprises an inorganic material.

5. The solidified porous composite of claim 4, in which the inorganic material comprises an inorganic oxide, a carbonate, a hydroxide, alumina, silica, zirconia, titania, mica, boehmite, or mixtures of any of the foregoing.

6. The solidified porous composite of claim 4, in which the inorganic material comprises about 30 wt % to about 90 wt % of the solidified porous composite.

7. The solidified porous composite of claim 4, in which the particulate filler material further comprises an additive.

8. The solidified porous composite of claim 7, in which the additive comprises a hydrogen-evolution inhibitor, electrolyte-soluble pore former, a structure-enhancing agent, a wettability-enhancing agent, a fragrance, or combinations thereof.

9. The solidified porous composite of claim 1, in which the solidified porous composite comprises a sheet having flat major surfaces, patterned major surfaces, or combinations thereof.

10. The solidified porous composite of claim 9, in which the sheet has at least one patterned major surface and has regions with a thickness of about 0.3 mm to about 0.6 mm or about 0.4 mm to about 0.5 mm and has regions with a thickness of about 0.5 mm to about 5 mm or about 1 mm to about 3 mm.

11. A porous composite comprising:
a thermally-expanded polymer matrix and a particulate filler material distributed throughout the polymer matrix, wherein the polymer matrix comprises polymer microspheres having been compression and heat-bonded via thermal expansion of the polymer microspheres in a fixed volume cavity of a mold, wherein at least a portion of the compression and heat-bonded polymer microspheres are ruptured, the thermally-expanded polymer matrix having solidified and conformed to a shape of the fixed volume cavity,
wherein the porous composite comprises interconnected pores extending through the polymer matrix and a porosity of 30% or more; and wherein the porous composite is a fragrance storage device and comprises a fragrance at least partially occupying the interconnected pores.

12. The solidified porous composite of claim 1, in which the particulate filler material further comprises an additive, wherein the additive comprises a hydrogen-evolution inhibitor, electrolyte-soluble pore former, a structure-enhancing agent, a wettability-enhancing agent, or combinations thereof.

13. A porous composite substantially only comprising:
a thermally-expanded polymer matrix substantially only including polymer microspheres, wherein the polymer matrix comprises polymer microspheres having been compression and heat-bonded via thermal expansion of the polymer microspheres in a fixed volume cavity of a mold, wherein at least a portion of the compression and heat-bonded polymer microspheres are ruptured, the thermally-expanded polymer matrix having solidified and conformed to a shape of the fixed volume cavity; and a particulate filler material distributed throughout the polymer matrix; and
a fragrance;
wherein the porous composite comprises interconnected pores extending through the polymer matrix and a porosity of 30% or more, and wherein the porous composite comprises between 30 wt % and 90 wt % of the particulate filler material;
wherein the porous composite is a fragrance storage device including the fragrance at least partially occupying the interconnected pores; and
wherein the porous composite is free of a mechanical reinforcement material.

14. The solidified porous composite of claim 1, wherein the solidified porous composite consists of a thermally-expanded polymer matrix consisting of compression and heat-bonded polymer microspheres and the particulate filler material distributed throughout the polymer matrix.

\* \* \* \* \*